United States Patent
Samarasinha (10) Patent No.: US 10,823,140 B2
(45) Date of Patent: Nov. 3, 2020

(54) VERTICAL AXIS WIND TURBINE STRUCTURE

(71) Applicant: Linton K. Samarasinha, Portage, MI (US)

(72) Inventor: Linton K. Samarasinha, Portage, MI (US)

( * ) Notice: Subject to any disclaimer, the term of this patent is extended or adjusted under 35 U.S.C. 154(b) by 453 days.

(21) Appl. No.: 15/194,820

(22) Filed: Jun. 28, 2016

(65) Prior Publication Data

US 2017/0130696 A1     May 11, 2017

Related U.S. Application Data

(60) Provisional application No. 62/251,779, filed on Nov. 6, 2015.

(51) Int. Cl.
| | |
|---|---|
| *F03D 3/02* | (2006.01) |
| *F03D 3/00* | (2006.01) |
| *F03D 3/04* | (2006.01) |
| *F03D 80/30* | (2016.01) |
| *F03D 15/00* | (2016.01) |

(52) U.S. Cl.
CPC ............. *F03D 3/02* (2013.01); *F03D 3/005* (2013.01); *F03D 3/0436* (2013.01); *F03D 15/00* (2016.05); *F03D 80/30* (2016.05); *Y02E 10/74* (2013.01)

(58) Field of Classification Search
CPC ........... F03D 3/02; F03D 3/0436; F03D 3/005
See application file for complete search history.

(56) References Cited

U.S. PATENT DOCUMENTS

| | | | | |
|---|---|---|---|---|
| 685,774 | A * | 11/1901 | Lieske | F03D 3/067 416/118 |
| 2,128,592 | A * | 8/1938 | Mushkin | F03D 3/067 416/111 |
| 5,256,034 | A * | 10/1993 | Sultzbaugh | F03D 3/061 415/914 |
| 6,784,566 | B2 | 8/2004 | Thomas | |
| 6,942,454 | B2 | 9/2005 | Ohlmann | |
| 7,056,082 | B1 * | 6/2006 | Taylor | F03D 3/005 415/4.2 |
| 7,329,965 | B2 | 2/2008 | Roberts | |

(Continued)

*Primary Examiner* — Woody A Lee, Jr.
(74) *Attorney, Agent, or Firm* — Boudwin Intellectual Property; Daniel Boudwin (57) ABSTRACT

A vertical axis wind turbine structure is provided that comprises an upstanding structure having a plurality of levels, each level supporting a vertical axis wind turbine assembly therein. Each vertical axis wind turbine assembly drives a generator that develops electrical power. The wind turbine assemblies further comprise a plurality of rotor arms, each supporting a louvered vane assembly thereon. The louvered vane assemblies have louvered vanes supported within a frame that adjust based on the wind front direction. Finally, the outer surface of each of level comprises a rotatable outer surface, whereby an opening through the outer surface allows air flow into the interior thereof and across the louvered vane assemblies. The outer surface of the structure and the louvered vane assemblies adjust based on wind front direction. Overall, the present invention provides a new wind turbine construction that is efficient, modular, and reactive to wind conditions.

12 Claims, 6 Drawing Sheets

(56) References Cited

U.S. PATENT DOCUMENTS

| | | | | |
|---|---|---|---|---|
| 7,471,006 B2 * | 12/2008 | Janca | ............... | F03B 17/062 |
| | | | | 290/43 |
| 7,696,635 B2 | 4/2010 | Boone | | |
| 8,016,544 B1 * | 9/2011 | Nguyen | ............... | F03D 3/067 |
| | | | | 415/130 |
| 8,164,210 B2 | 4/2012 | Boone | | |
| 8,508,065 B1 * | 8/2013 | Lee | ............... | F03D 3/005 |
| | | | | 290/54 |
| 8,702,393 B2 * | 4/2014 | Al-Azzawi | ............... | F03D 3/068 |
| | | | | 416/132 A |
| 8,847,423 B2 * | 9/2014 | Wang | ............... | F03D 3/067 |
| | | | | 290/55 |
| 8,961,103 B1 * | 2/2015 | Wolff | ............... | F03D 3/0409 |
| | | | | 415/4.2 |
| 9,024,463 B2 | 5/2015 | Boone | | |
| 9,328,717 B1 * | 5/2016 | Walker | ............... | F03D 3/005 |
| 9,521,858 B2 * | 12/2016 | Szydlowski | ............... | C12G 1/00 |
| 10,030,629 B2 | 7/2018 | Huang | ............... | F03D 3/067 |
| 2004/0018087 A1 * | 1/2004 | Dow | ............... | F03D 3/005 |
| | | | | 416/119 |
| 2006/0108809 A1 * | 5/2006 | Scalzi | ............... | B60K 16/00 |
| | | | | 290/55 |
| 2007/0147998 A1 * | 6/2007 | Jang | ............... | F03D 3/005 |
| | | | | 416/132 B |
| 2007/0284885 A1 * | 12/2007 | Menges | ............... | F03D 3/005 |
| | | | | 290/55 |
| 2008/0217924 A1 | 9/2008 | Boone | | |
| 2009/0001730 A1 * | 1/2009 | Kuo | ............... | F03D 3/02 |
| | | | | 290/55 |
| 2009/0035134 A1 * | 2/2009 | Kuo | ............... | F03D 3/068 |
| | | | | 416/119 |
| 2009/0115194 A1 * | 5/2009 | Lin | ............... | F03D 3/005 |
| | | | | 290/55 |
| 2010/0109337 A1 * | 5/2010 | Wang | ............... | F03D 3/067 |
| | | | | 290/55 |
| 2010/0194251 A1 | 8/2010 | Sikes | | |
| 2012/0086214 A1 | 4/2012 | Roskey | | |
| 2012/0211992 A1 | 8/2012 | Boone | | |
| 2012/0326447 A1 | 12/2012 | Rodway | | |
| 2013/0119672 A1 | 5/2013 | Boone | | |
| 2013/0323056 A1 | 12/2013 | Su | | |
| 2014/0023500 A1 | 1/2014 | Antonio | | |
| 2014/0044542 A1 | 2/2014 | Foss | | |
| 2016/0025067 A1 * | 1/2016 | Pristash | ............... | F03D 3/005 |
| | | | | 290/55 |
| 2016/0076520 A1 * | 3/2016 | Pekelis | ............... | F03D 3/02 |
| | | | | 415/126 |
| 2017/0009736 A1 * | 1/2017 | Behrens | ............... | F03B 17/061 |

* cited by examiner

VERTICAL AXIS WIND TURBINE STRUCTURE

CROSS REFERENCE TO RELATED APPLICATION

This application claims the benefit of U.S. Provisional Application No. 62/251,779 filed on Nov. 6, 2015. The above identified patent application is herein incorporated by reference in its entirety to provide continuity of disclosure.

BACKGROUND OF THE INVENTION

Field of the Invention

The present invention relates to wind turbine devices for generating electrical power. More specifically, the present invention relates to a vertical axis wind turbine assembly having a vertical tower structure with several levels, whereby each level includes an independent vertical axis wind turbine assembly with louvered vanes.

The present invention is an improvements to vertical axis wind turbine structures. In particular, the present invention is a new wind turbine structure with a configuration that is adapted to respond to changing wind patterns and efficiency capture wind energy for power generation purposes. The structure comprises a plurality of rounded levels, whereby each level includes a vertical axis wind turbine, electrical generator, and a rotatable outer surface. The outer surface of the structure comprises one or more openings per level, whereby the outer surface rotates as the wind direction changes, while each vertical axis wind turbine assembly on each level includes a plurality of rotor arms supporting louvered vane assemblies. Each level captures wind flowing from a given wind front direction and generates electrical power using a generator on the same level. The electrical power is then transformed for supplying grid power or is otherwise stored or transmitted.

Much of today's energy is derived from fossil fuels that produce carbon dioxide and other greenhouse gases. Despite the ease of access to fossil fuels and its existing infrastructure, fossil fuel energy creates pollution and is a limited resource. Therefore, more efficient, environmentally-friendly, and long-term fuel sources are necessary. The present invention is a structure that is designed to provide efficient capture and generation of electrical power via wind energy. A wind adaptable structure and individual wind turbine assemblies are provided, which drive several electrical generators to deliver electrical energy from the structure. This electrical energy can be stored or transmitted for direct use.

In addition to improving efficiency, the present invention also provides a substantially enclosed wind turbine device that does not expose wildlife to danger. Most windmills include large, exposed rotor blades that turn in the wind. While their large cross section is useful for capturing the wind, their construction poses a risk to birds and other wildlife. The present invention provides a substantially enclosed and multi-level assembly that does not pose these risks to wildlife. Overall, the present invention advances the art of windmills and wind turbine devices by providing a unique wind turbine structure that can be scaled and integrated into existing electrical grid systems.

SUMMARY OF THE INVENTION

The following summary is intended solely for the benefit of the reader and is not intended to be limiting in any way.

The present invention provides a new wind turbine structure that can develop electrical energy from wind power using an upright, multi-level construction.

It is therefore an object of the present invention to provide a new and improved wind turbine structure that has all of the advantages of the prior art and none of the disadvantages.

It is another object of the present invention to provide a wind turbine structure that comprises an upstanding structure having a plurality of levels, each level supporting a vertical axis wind turbine assembly that is adapted to capture wind energy. Each of the levels comprises an interior volume, a central axis, an upper surface, and a lower surface. The upstanding structure comprises a rotatable outer surface.

Another object of the present invention is to provide a wind turbine structure in which the vertical axis wind turbine assembly of each level comprises a plurality of rotor arms, each of the rotor arms supporting a louvered vane assembly.

Another object of the present invention is to provide a wind turbine structure in which the louvered vane assembly of each vertical axis wind turbine assembly comprises a plurality of louvered vanes that are rotatably disposed within a frame. The louvered vanes close to form a substantially planar surface across the frame when the frame is substantially perpendicular to a first wind direction, and rotate into an open position within the frame to allow air flow therethrough when the louvered vanes are not substantially perpendicular to the first wind direction;

Another object of the present invention is to provide a wind turbine structure in which the vertical axis wind turbine assemblies each drive a generator disposed on each level. The generators are adapted to create electrical power from rotational input of the vertical axis wind turbine assembly on the given level.

Yet another object of the present invention is to provide a wind turbine structure wherein the outer surface of each level further comprises a closed surface therearound and at least one opening therethrough that is adapted to allow air flow through the outer surface and into the interior volume of the level.

Another object of the present invention is to provide a wind turbine structure wherein the outer surface of each level further comprises a rounded outer surface such that the upstanding structure comprises a substantially cylindrical shape.

Another object of the present invention is to provide a wind turbine structure wherein the upper end of the upstanding structure further comprises a wind vane. The wind vane is coupled to the outer surface of the upstanding structure and is aligned with the opening of each level. The wind vane is adapted rotate based on the first wind direction, and is sized to rotate of the outer surface of the upstanding structure and position each opening toward the first wind direction.

Another object of the present invention is to provide a wind turbine structure wherein the wind vane is affixed to the upper end of the upstanding structure, and the upper end of the upstanding structure is affixed to the outer surface thereof.

Another object of the present invention is to provide a wind turbine structure wherein each level further comprises a wind deflector extending outward from the outer surface thereof. The wind deflectors are disposed along the outer surface of each level and adjacent to the one or more openings, whereby the wind deflectors have one or more angles to deflect wind into an opening of an adjacent level.

The wind deflectors thereby deflect wind upwards and/or downwards and into an opening of an adjacent level.

Another object of the present invention is to provide a wind turbine structure wherein the wind deflectors further comprise substantially triangular cross sections.

Another object of the present invention is to provide a wind turbine structure wherein the outer surface of the upstanding structure is rotatable relative to the central axis such that the opening therethrough can adjust relative to the first wind direction.

Another object of the present invention is to provide a wind turbine structure wherein the plurality of rotor arms has a central hub. The central hub is rotatably connected to the generator such that rotation of the rotor arms rotates the central hub and rotates the generator.

Another object of the present invention is to provide a wind turbine structure that further comprises a drive train assembly disposed between the central hub and the generator on each level.

Another object of the present invention is to provide a wind turbine structure wherein the drive train assembly further comprises a drive pulley and a driven pulley. The drive pulley is driven by the central hub of the plurality of rotor arms, while the driven pulley is connected to the drive pulley by way of a drive belt. Finally, the driven pulley is connected to the generator.

Another object of the present invention is to provide a wind turbine structure wherein the driven pulley is connected to the drive pulley by way of a drive chain.

Another object of the present invention is to provide a wind turbine structure wherein the drive train assembly further comprises a drive gear and a driven gear. The drive gear is driven by the central hub of the plurality of rotor arms, and the driven gear is coupled to the drive gear. The driven gear is then connected to the generator on the given level.

Another object of the present invention is to provide a wind turbine structure wherein the rotor arms of each vertical axis wind turbine assembly further comprises an outer extent. The outer extent is supported by a bearing element around a periphery of the level.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the vertical axis wind turbine structure of the present invention. For the purposes of presenting a brief and clear description of the present invention, the preferred embodiment will be discussed as used for generating electrical power using an upstanding, multi-level structure having a vertical axis wind turbine assembly on each level. The figures are intended for representative purposes only and should not be considered to be limiting in any respect.

Figure 1:
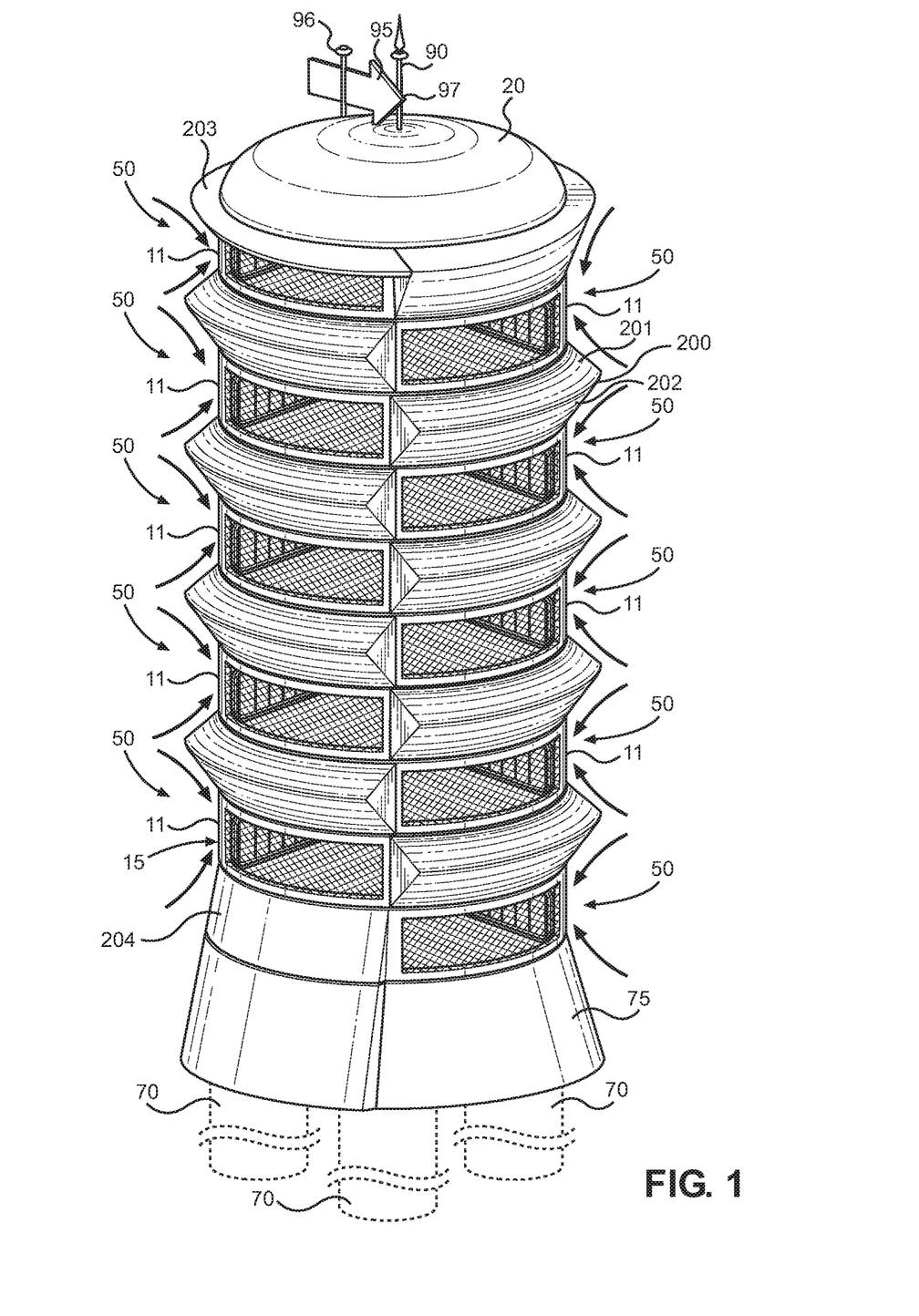
FIG. 1 shows an exemplary view of the vertical axis wind turbine of the present invention, in which a multi-level structure is provided.
Figure 1A:
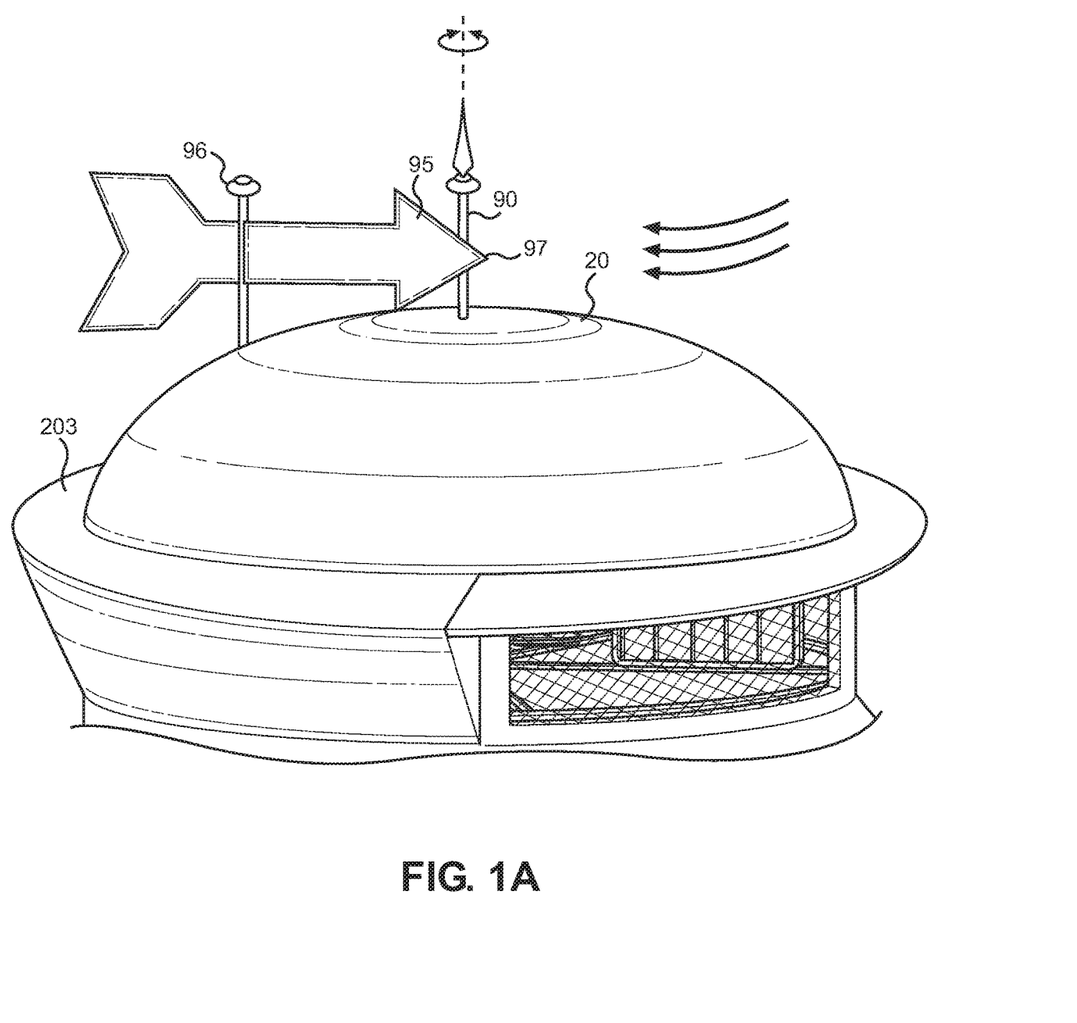
FIG. 1A shows a side view of the upper end of the upstanding structure.
Figure 2:
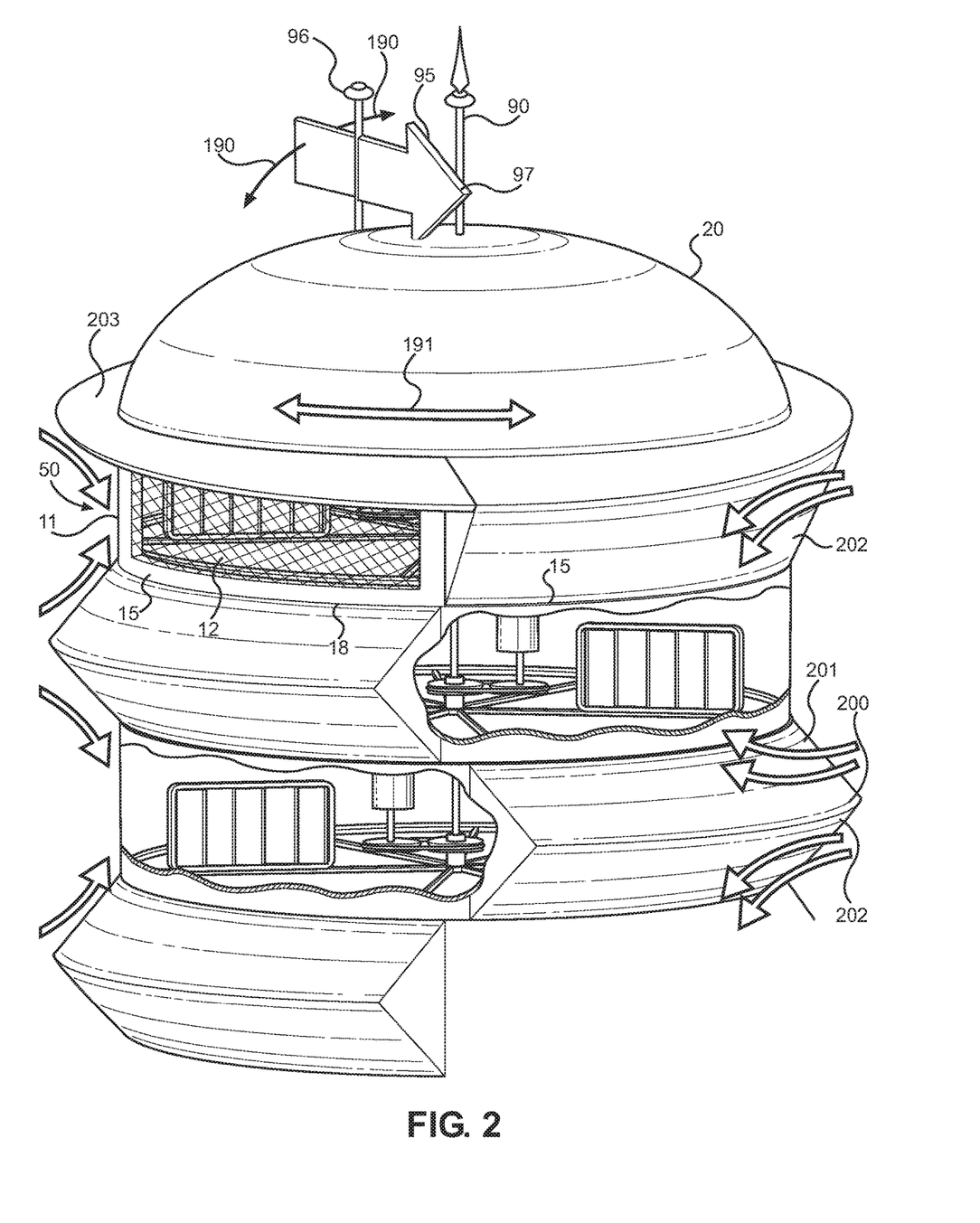
FIG. 2 shows a view of the vertical axis wind turbine of the present invention with several cut-outs provided for visualizing the interior of each level.

Referring now to FIGS. 1, 1A, and 2, there are shown views of the vertical axis wind turbine structure of the present invention. The wind turbine structure is an upstanding structure having a plurality of levels 11, each level 11 supporting a vertical axis wind turbine assembly 50 therein. The levels 11 are preferably stacked in a vertical arrangement, with each level having a vertical axis wind turbine assembly 50 and an electrical generator therein. Air pressure from a wind front 101 induces rotation of the vertical axis wind turbine assemblies 50, which drive the individual generators to transform kinetic energy into electrical energy. Overall, the structure is scalable, modular, and an efficient design for capturing wind energy.

The levels 11 of the wind turbine structure each comprises an interior volume, a central axis, an upper surface 17, and a lower surface 18. In addition, the levels are shrouded by an outer surface 15 that extends across the entire height of the upstanding structure and preferably rotates as a singular unit. The outer surface 15 is one that forms a periphery around the structure and has one or more openings 12 on each level 11. The openings 12 allow air flow into the interior of each level such that the air pressure is directed onto the vertical axis wind turbine 50 therein to rotate the same. The openings 12 are preferably screened or otherwise filtered to prevent debris, wildlife, or other foreign objects from entering the level interior. The screens therefore filter the air of debris while allowing air to enter and/or exit the level. The openings 12 may be provided along one side of the outer surface 15, or alternatively along a front and rear side of the outer surface to allow air flow therethrough.

The outer surface 15 is rotatable relative to the interior structure of the device, whereby the openings 12 can move around the periphery of the structure depending on the wind front direction. The outer surface 15 is preferably mounted to tracks along the interior of the structure. This allows the openings 12 to rotate 101 commensurately with the wind front 100, thereby allowing the opening 12 to face the wind front 100 independent of the direction of the wind front 100. In operation, this allows the static structure to adapt to a changing wind direction, thereby facing the opening towards the wind front and allowing wind to enter the opening 12 and rotate the vertical axis wind turbine 50 therein. The outer surface 15 preferably freely rotate and adjusts the position of the opening accordingly to capture the wind.

Controlling the rotation of the outer surface 15 of the upstanding structure is an enlarged wind vane 95 along the upper end 20 of the structure. The upper end 20 of the structure forms a roof, which may be dome-shaped or otherwise configured. The wind vane 95 is statically connected to the outer surface 15 for the structure, either directly or via the upper end 20. In the latter case, the upper end 20 would also rotate with the outer surface 11. The wind vane 95 rotates about a central axis or fixed axis along the structure, and rotates therearound by way of the wind front direction. The wind vane 95 is enlarged and biased to face the wind front, thereby inducing the wind vane 95 to rotate accordingly and rotate the outer surface 11 of the upstanding structure. The openings 12 along the outer surface 11 are preferably disposed along the outer surface 11 such that the openings face the wind front when the wind vane 95 is facing the wind front, thereby allowing the air pressure to enter through the openings 12 in each level and rotate the wind turbines therein.

The upstanding structure of the present invention preferably forms an upstanding, substantially cylindrical structure. The lowermost level may be at ground level or supported by a support structure 70 in an elevated position. These may include raised footers 70 or other structure necessary to maintain the upright structure in a static condition in high winds and other weather conditions. Along the uppermost level, the structure may be aerodynamically shaped, forming a dome 20 thereover. In addition, the upper end of the structure also supports a wind vane 95, a lightning rod, and a support 96 for the wind vane 95. Overall, the cross section of the structure is compact, modular, and does not pose a risk to wildlife while in operation.

Along the outer surface 11 of the structure and between the openings 11 of different levels are deflector devices 200. The deflectors 200 are faceted protrusions that extend outward from the outer surface 11 and direct the flow of air upwards and downwards to adjacent levels. In one preferred configuration, the deflectors 200 are faceted structures with triangular cross sections, whereby the openings of adjacent levels are above and below each of the deflectors 200. The uppermost deflectors 203 deflect air downward, while the lowermost deflector 204 deflects air upward. Similarly, the lower end 75 of the structure may be curved to direct air upwards and into the opening of the lower level. Between adjacent levels, the deflectors 200 are preferably triangular shaped and form an aerodynamic structure that reduces wind resistance and induces the flow of air into the openings on adjacent levels.

Figure 3:
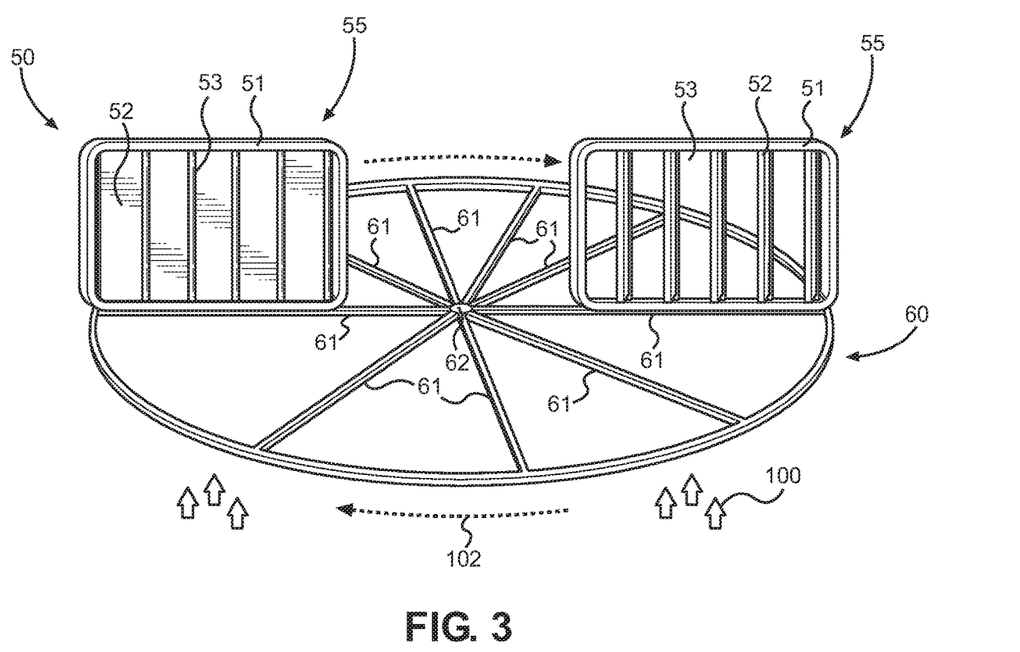
FIG. 3 shows another view of the vertical axis wind turbine assembly on each floor
Figure 4:
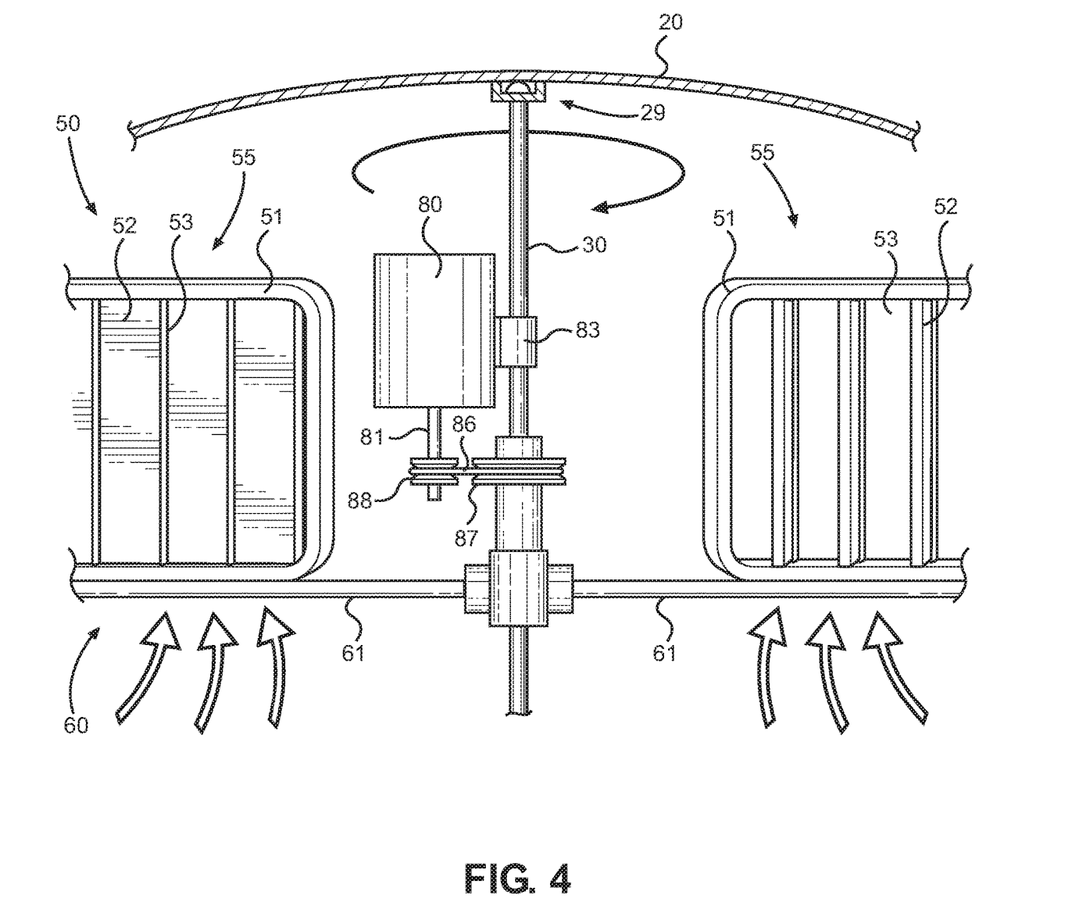
FIG. 4 shows another view of the vertical axis wind turbine assembly on each floor

Referring now to FIGS. 3 and 4, there are shown views of the vertical axis wind turbine assembly 50. Along each level is a vertical axis wind turbine assembly 50, which comprises a plurality of rotor arms 61 extending from a central hub 62. The rotor arms 61 support one or more louvered vane assemblies thereon that are adapted to capture air pressure in the optimum position and allow air to pass therethrough when not positioned in the face of a wind front. In particular, each of the louvered vane assemblies comprises a plurality of louvered vanes 52 that are rotatably disposed within a frame 51. The louvered vanes 52 rotate relative to the frame 51 such that the vanes 52 are closed to form a substantially planar surface across the frame 51 when the frame 51 is substantially perpendicular to a first wind direction 100. When not in the direction of the wind 100, the louvered vanes 52 rotate into an open position within the frame 51 to allow air flow therethrough and between the louvered vanes 52. This allows the louvered vane assembly to capture wind energy in the most efficient manner possible, while transforming into an open frame to prevent drag on the rotor 61 when the louvered vane assembly is not facing the wind 100.

The louvered vane assemblies drive the rotor assembly 60 such that it rotates 102 about its central hub 62. This rotation 102 is coupled to the generator on the level to generate electric power. In operation, the louvered vanes 52 continually rotate within their frames 51 as the position of the frame 51 changes in a given rotation. The rotation of the vanes 52 may be computer controlled, or the vanes 52 may be biased such that when the louvered vane assemblies are not in front of the opening of a level, the vanes open to prevent drag on the rotor assembly 60.

Figure 5:
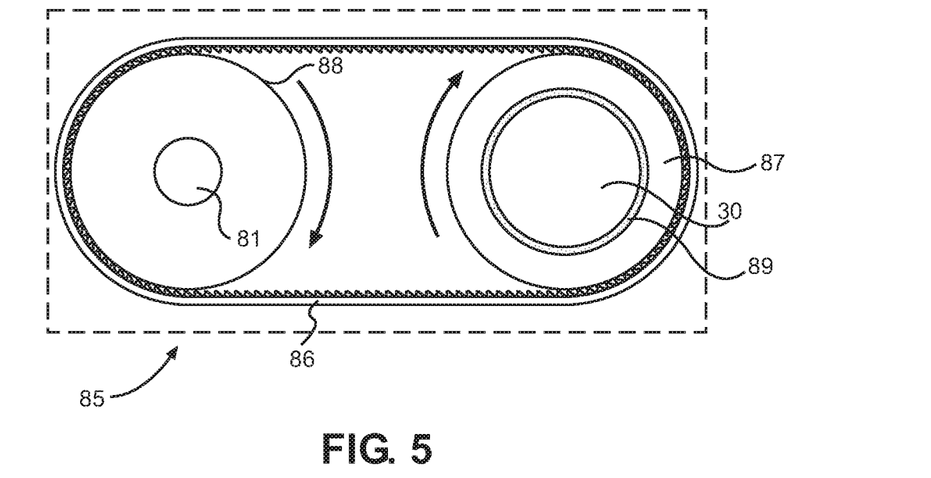
FIG. 5 shows a view of an embodiment of the drive train assembly of the present invention.
Figure 6:
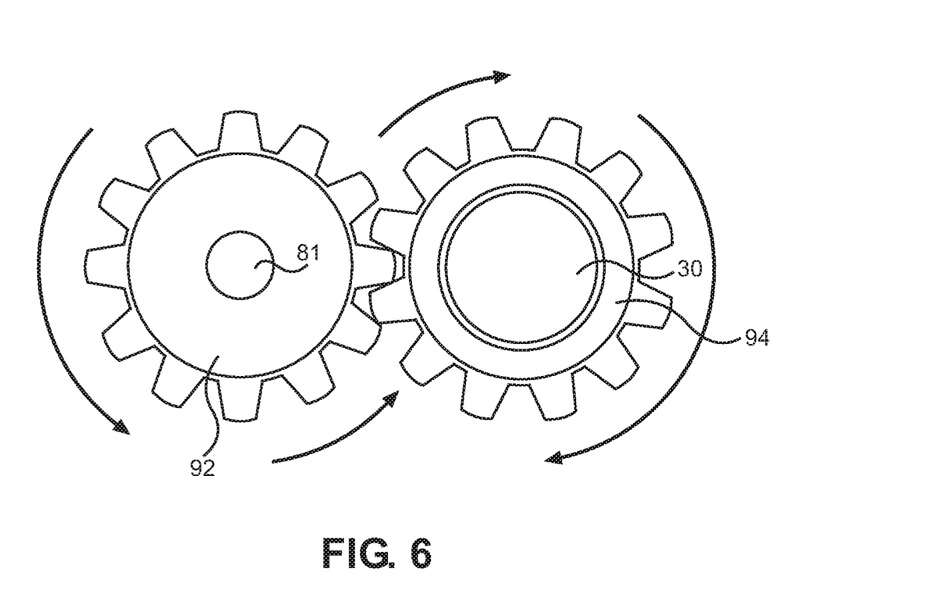
FIG. 6 shows another embodiment of the drive train assembly of the present invention.

As shown in FIGS. 4 through 6, each of the vertical axis wind turbine assemblies 50 drives a generator 80, whereby each generators 80 is adapted to generate electrical power from rotational input from the rotor assembly 60. In particular, as air pressure drives the closed vanes 52 the louvered vane assembly along one of the rotors 61, the rotor assembly begins to rotate around a central shaft 30 within the interior of the given level. The rotor assembly is coupled to the generator 80 preferably with an intermediate drive train assembly 85 therebetween, thereby altering the speed and torque characteristics of the incoming rotational energy turning the generator 80. The drive train 85 may alter the speed ratio between the rotation of the rotor assembly 60 and the rotation of the generator drive shaft 81. The generator 80 is preferably statically coupled to the central shaft 30 by way of a support 83.

In one embodiment, the drive train assembly 85 further comprises a drive pulley 87 and a driven pulley 88. The drive pulley 87 is driven by the central hub of the plurality of rotor arms 61 and may be rotatable about the central shaft 30 of the level. The central shaft extends the height of the structure and extends through each of the levels, whereby the upper end 20 of the structure is rotatable relative thereto by way of a bearing or equivalent joint. Along each level, the driven pulley 88 is connected to the drive pulley 87 by way of a drive belt 86 or drive chain, whereby the driven pulley 88 is connected to the generator 80 by way of the generator drive shaft 81. The drive pulley 87 and the driven pulley 88 may have different diameters, thereby changing the speed ratio between the rotor assembly and the drive shaft 81 of the generator 80. Additionally, the drive pulley 87 may be rotatably coupled to the central shaft 30 of the level and separated therefrom by a bearing element 89. By separating the rotation of the rotor assembly 60 from the generator drive shaft 81, the speed ratio can be altered. In addition, a clutch may be placed therebetween to operably couple and decouple the generator 80 from the rotor assembly 60.

In another embodiment, the drive train assembly 85 may comprise a gear train assembly comprising two or more gears. A drive gear 94 is driven by the rotor assembly 60, whereby the drive gear 94 is coupled to a driven gear 92. The gears include gear teeth that mesh together, whereby the drive gear 94 imparts rotational motion on the driven gear 92, which in turn drives the drive shaft 81 of the generator. The drive gear 94 is driven by the plurality of rotor arms and drives the driven gear. This causes the driven gear 92 to drive the generator 80. The gear train assembly may comprise one or more driven gears 92 that may be operably coupled to the generator drive shaft 81, similar to a transmission assembly. In this way, the speed ratio between the drive gear and the generator drive shaft 81 can be altered. Additionally, a clutch may be placed therebetween to operably couple and decouple the generator 80 from the rotor assembly 60.

Supporting the rotor assemblies 61 is a central shaft along the hub of the rotor assemblies 60. Along the outer extent of the rotors 61 may also be a second support in the form of bearing elements. The bearing elements support the ends of the rotors 61 as they rotate around the periphery of the interior of the given level. This allows the rotors 61 to be supported along both ends, thereby allowing the rotors to support the load of the louvered vane assemblies thereon.

Overall, the present invention provides a multi-level wind turbine structure that is efficient, modular, and adaptable. A plurality of levels is provided, whereby an rotatable outer surface rotates therearound based on the wind direction. The outer surface includes at least one opening per level to allow air flow therein, while the vertical axis wind turbine assemblies disposed on each level are adapted to capture wind energy while minimizing drag. Finally, a generator is provided on each level, whereby the wind turbine assemblies each drive an independent generator. The collective electrical power can be transmitted to a central source for transformation, transmission, or storage thereof.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vertical axis wind turbine structure, comprising:
   an upstanding structure having a plurality of levels, each level supporting a vertical axis wind turbine assembly;
   the upstanding structure having an outer surface and an upper end;
   each of the levels forming an interior volume, a central axis, an upper surface, and a lower surface;
   each vertical axis wind turbine assembly comprising a plurality of rotor arms, each of the rotor arms supporting a louvered vane assembly;
   each louvered vane assembly comprising a plurality of louvered vanes that are rotatably disposed within a frame;
   wherein the louvered vanes close to form a substantially planar surface across the frame when the frame is substantially perpendicular to a first wind direction;
   wherein the louvered vanes are adapted to rotate into an open position within the frame to allow airflow therethrough when the louvered vanes are not substantially perpendicular to the first wind direction;
   each vertical axis wind turbine assembly drives a generator, each generator being adapted to generate electrical power from rotational input;
   the outer surface of the upstanding structure having at least one opening of each of the levels that is adapted to allow airflow through the outer surface and into the interior volume of each level.

2. The vertical axis wind turbine structure of claim 1, wherein:
   the upper end of the upstanding structure further comprises a wind vane;
   wherein the wind vane is coupled to the outer surface of the upstanding structure and is aligned with the at least one opening of each level; and
   wherein the wind vane is adapted rotate based on the first wind direction, thereby adapted to rotate of the outer surface of the upstanding structure and position the at least one opening of each level toward the first wind direction.

3. The vertical axis wind turbine structure of claim 2, wherein:
   the wind vane is affixed to the upper end of the upstanding structure; and
   wherein the upper end of the upstanding structure is affixed to the outer surface thereof.

4. The vertical axis wind turbine structure of claim 1, wherein:
   each level further comprises a wind deflector extending outward therefrom;
   wherein the wind deflector is disposed along the outer surface of each level and adjacent to the at least one openings;
   the wind deflector having one or more angles to deflect wind into an opening of an adjacent level.

5. The vertical axis wind turbine structure of claim 4, wherein the wind deflectors further comprise substantially triangular cross sections.

6. The vertical axis wind turbine structure of claim 1, wherein the upper end further comprises a lightning rod.

7. The vertical axis wind turbine structure of claim 1, wherein the outer surface of each level further comprises a rounded outer surface such that the upstanding structure comprises a substantially cylindrical shape.

8. The vertical axis wind turbine structure of claim 1, wherein:
   the plurality of rotor arms of each vertical axis wind turbine assembly has a central hub;
   each central hub is rotatably connected to a generator such that rotation of the rotor arms rotates the central hub and rotates the generator.

9. The vertical axis wind turbine structure of claim 8, further comprising a drive train assembly disposed between each central hub and the corresponding generator.

10. The vertical axis wind turbine structure of claim 9, wherein:
    the drive train assembly further comprises a drive pulley and a driven pulley;
    the drive pulley being driven by the central hub of the plurality of rotor arms;
    the driven pulley being connected to the drive pulley by way of a drive belt; and
    whereby the driven pulley is connected to the generator.

11. The vertical axis wind turbine structure of claim 9, wherein:
    the drive train assembly further comprises a drive pulley and a driven pulley;
    the drive pulley being driven by the central hub of the plurality of rotor arms;
    the driven pulley being connected to the drive pulley by way of a drive chain; and
    whereby the driven pulley is connected to the generator.

12. The vertical axis wind turbine structure of claim 9, wherein:
    the drive train assembly further comprises a drive gear and a driven gear;

the drive gear being driven by the central hub of the plurality of rotor arms;

the driven gear being coupled to the drive gear; and whereby the driven gear is connected to the generator.

\* \* \* \* \*